(12) United States Patent
Wade et al.

(10) Patent No.: US 8,640,241 B2
(45) Date of Patent: Jan. 28, 2014

(54) DATA IDENTIFICATION SYSTEM (75) Inventors: Gregory L. Wade, San Jose, CA (US);
J. Mitchell Haile, Somerville, MA (US)

(73) Assignee: Quatum Corporation, San Jose, CA (US)

( * ) Notice: Subject to any disclaimer, the term of this patent is extended or adjusted under 35 U.S.C. 154(b) by 621 days.

(21) Appl. No.: 12/764,771

(22) Filed: Apr. 21, 2010

(65) Prior Publication Data

US 2011/0119763 A1 May 19, 2011

Related U.S. Application Data (60) Provisional application No. 61/261,526, filed on Nov. 16, 2009.

(51) Int. Cl.
*G06F 21/00* (2013.01)

(52) U.S. Cl.
USPC ............. 726/24; 726/22; 726/23; 713/187; 713/188; 713/197

(58) Field of Classification Search
USPC ............................................ 726/24; 713/187
See application file for complete search history.

(56) References Cited

U.S. PATENT DOCUMENTS

| | | | | |
|---|---|---|---|---|
| 7,216,366 B1 * | 5/2007 | Raz et al. | | 726/24 |
| 7,861,302 B1 * | 12/2010 | Raz et al. | | 726/24 |
| 7,904,419 B1 | 3/2011 | Milby et al. | | |
| 8,127,358 B1 * | 2/2012 | Lee | | 726/24 |
| 8,135,930 B1 | 3/2012 | Mattox et al. | | |
| 8,205,261 B1 * | 6/2012 | Andruss et al. | | 726/24 |
| 2002/0116639 A1 * | 8/2002 | Chefalas et al. | | 713/201 |
| 2005/0015599 A1 | 1/2005 | Wang et al. | | |
| 2005/0132206 A1 | 6/2005 | Palliyil et al. | | |
| 2005/0240633 A1 * | 10/2005 | Krishnaswamy et al. | | 707/200 |
| 2006/0136910 A1 * | 6/2006 | Brickell et al. | | 718/1 |
| 2006/0136911 A1 * | 6/2006 | Robinson et al. | | 718/1 |
| 2007/0074290 A1 | 3/2007 | Kobayashi et al. | | |
| 2008/0133518 A1 | 6/2008 | Kapoor et al. | | |
| 2008/0178290 A1 * | 7/2008 | Besch et al. | | 726/22 |
| 2009/0089880 A1 | 4/2009 | Kobayashi et al. | | |
| 2009/0094698 A1 * | 4/2009 | Nichols et al. | | 726/24 |
| 2009/0158432 A1 * | 6/2009 | Zheng et al. | | 726/24 |
| 2010/0011178 A1 | 1/2010 | Feathergill | | |
| 2010/0083381 A1 * | 4/2010 | Khosravi et al. | | 726/24 |
| 2011/0029972 A1 * | 2/2011 | Wade et al. | | 718/1 |
| 2012/0016840 A1 | 1/2012 | Lin et al. | | |

OTHER PUBLICATIONS

Zhang et al., "Virtual-Machine-based Intrusion Detection on File-aware Block Level Storage", 2006, pp. 1-8.*
Vassilakis et al., "A heuristics-based approach to reverse engineering of electronic services", Feb. 2009, pp. 1-12.*
Yao et al., "A heuristics-based approach to reverse engineering of electronic services", 2008, pp. 1-5.*

* cited by examiner

*Primary Examiner* — Luu Pham
*Assistant Examiner* — Yonas Bayou

(57) ABSTRACT

Disclosed is a method of operating a data storage system. The method comprises identifying changed segments of a primary storage volume, receiving a data request for a plurality of data items in a secondary storage volume, identifying changed data items of the plurality of data items in the secondary storage volume based on a correspondence between the plurality of data items in the secondary storage volume and the changed segments of the primary storage volume, and transferring the changed data items in response to the data request.

16 Claims, 10 Drawing Sheets

DATA IDENTIFICATION SYSTEM

RELATED APPLICATIONS

This application is related to and claims priority to U.S. Provisional Patent Application No. 61/261,526, entitled "Incremental Virus Scanning," filed on Nov. 16, 2009, and which is hereby incorporated by reference in its entirety.

TECHNICAL BACKGROUND

In the field of computer hardware and software technology, a virtual machine is a software implementation of a machine (computer) that executes program instructions like a real machine. Virtual machine technology allows for the sharing of, between multiple virtual machines, the physical resources underlying the virtual machines.

In virtual machine environments, storage volumes within the virtual machines contain data items that need to be accessed and scanned. Unfortunately, accessing the underlying contents of a storage volume can be very resource intensive, reducing the performance of a virtual machine and other operations within a virtual machine environment.

OVERVIEW

Disclosed are data identification systems and methods of operating data identification systems. In an embodiment, a method comprises identifying changed segments of a primary storage volume, receiving a data request for a plurality of data items in a secondary storage volume, identifying changed data items of the plurality of data items in the secondary storage volume based on a correspondence between the plurality of data items in the secondary storage volume and the changed segments of the primary storage volume, and transferring the changed data items in response to the data request.

In an embodiment, identifying the changed segments of the primary storage volume further comprises generating a request for a changed segment list, transferring the request for the changed segment list, receiving the changed segment list, and processing the changed segment list to determine the changed segments of the primary storage volume.

In an embodiment, the data request comprises a scan request to scan the plurality of data items.

In an embodiment, receiving the changed data items and responsively scanning the changed data items for a virus.

In an embodiment, transferring unchanged data items in response to detecting a virus in one of the changed data items, wherein the unchanged data items represent all data items except the changed data items.

In an embodiment, the primary storage volume comprises a virtual disk file.

In an embodiment, the secondary storage volume comprises a virtual storage device, and wherein the virtual disk file contains the first virtual storage device.

In an embodiment, transferring a request for the changed data items to the virtual storage device and receiving the changed data items in response to the request.

In an embodiment, the data request further comprises a request for a plurality of data items in a second secondary storage volume.

In an embodiment, identifying second changed blocks of a second primary storage volume, identifying second changed data items of the plurality of data items in the second secondary storage volume based on a correspondence between the plurality of data items in the second secondary storage volume and the second changed blocks of the second primary storage volume, and transferring the second changed data items in response to the data request.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In virtual machine environments, accessing the underlying contents of a storage volume can be very resource intensive, reducing the performance of a virtual machine and other operations within a virtual machine environment. Nonetheless, individual data items on a storage volume need to be accessed.

For example, when scanning data files for viruses, anti-virus software must walk the contents of a file system and scan files looking for infections. However, as with many processes, the scan process scales with the total number of files that need to be scanned. Thus, if the number of files that need scanning can be reduced, then the time to do the scan process can be reduced.

One way in which the number of data items on which a process needs to operate can be reduced is by operating only on those data items that have changed. Several software processes use this method.

An improved technique involves identifying changed data items in a storage volume based on the correspondence between the data items and the changed segments.

In an example, a guest operating system may be executed within a virtual machine that contains a virtual disk drive. The guest operating system may further include a file system for storage of the volume data. In this case, data items may be requested by a user via a data item request. It should be understood that the user may be a human operator, as well as other software applications, hardware elements, or the like.

In this case, changed segments of the file system are first determined. Data items in the virtual disk drive that have changed are then identified based on the correspondence between the changed data items and the changed segments of the file system.

Figure 1:
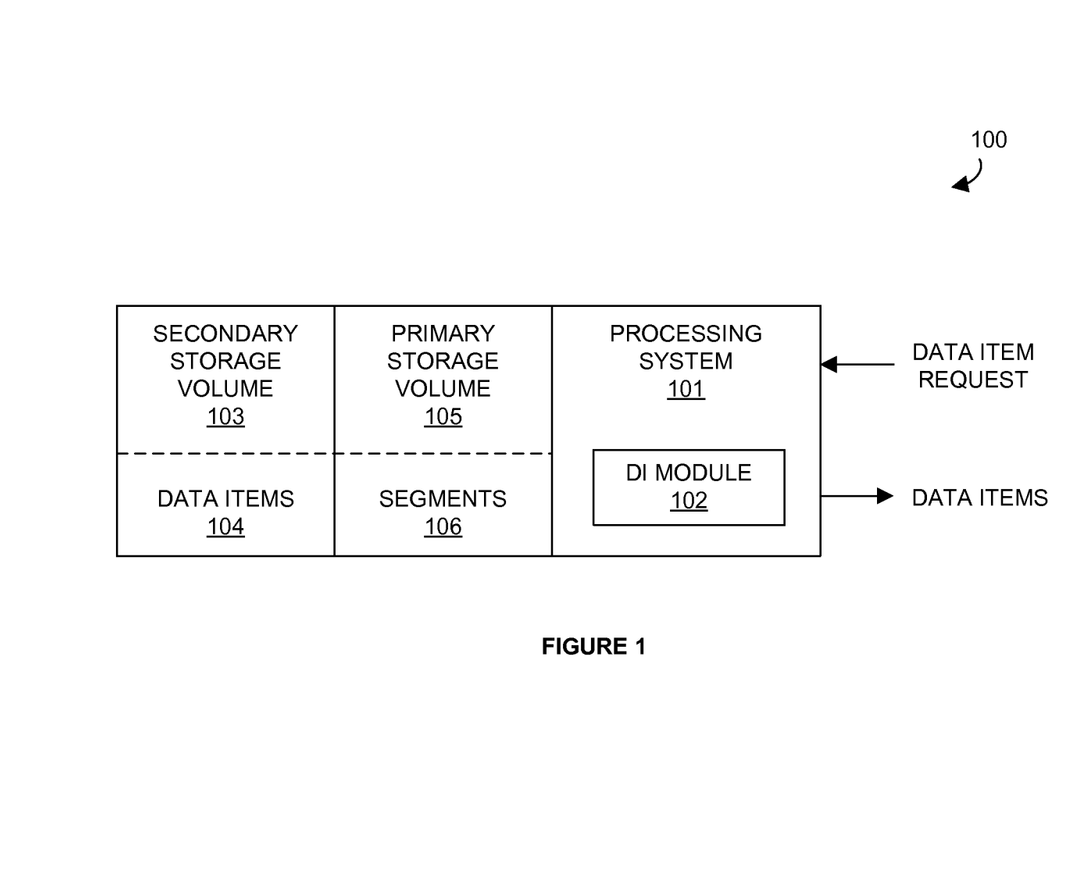
FIG. 1 illustrates a data identification system in an embodiment.

Referring now to FIG. 1, data identification system 100 is illustrated in an embodiment whereby a data identification (DI) module 102 is implemented in the data identification system in order to identify data items in a secondary storage volume. Data identification system 100 includes processing system 101, DI module 102, secondary storage volume 103, and primary storage volume 105.

Processing system 101 comprises any system or collection of systems capable of executing DI module 102 to identify data items in secondary storage volume 103. Processing system 101 may be a micro-processor, an application specific integrated circuit, a general purpose computer, a server computer, or any combination or variation thereof. Data identification module 102 may be program instructions executable by processing system 101.

Primary and secondary storage volumes 105 and 103, respectively, may be any storage volumes capable of storing a volume of data. Primary storage volume 105 comprises segments 106. Secondary storage volume comprises data items 104. Data items 104 comprise the volume of data in storage volume 103. Segments 106 comprise sections of a data volume in storage volume 105.

In an example, storage volume 103 may be a virtual storage volume. In this case, data items 104 may be the virtual storage contents of a data volume in storage volume 103. The data volume may itself be stored within another storage volume, such as storage volume 105. Segments 106 may then comprise sections of the data volume in storage volume 105. In this case, processing system 101 and/or primary storage volume 105 may additionally track segments 106 of the data volume in storage volume 105 that have changed.

Figure 2:
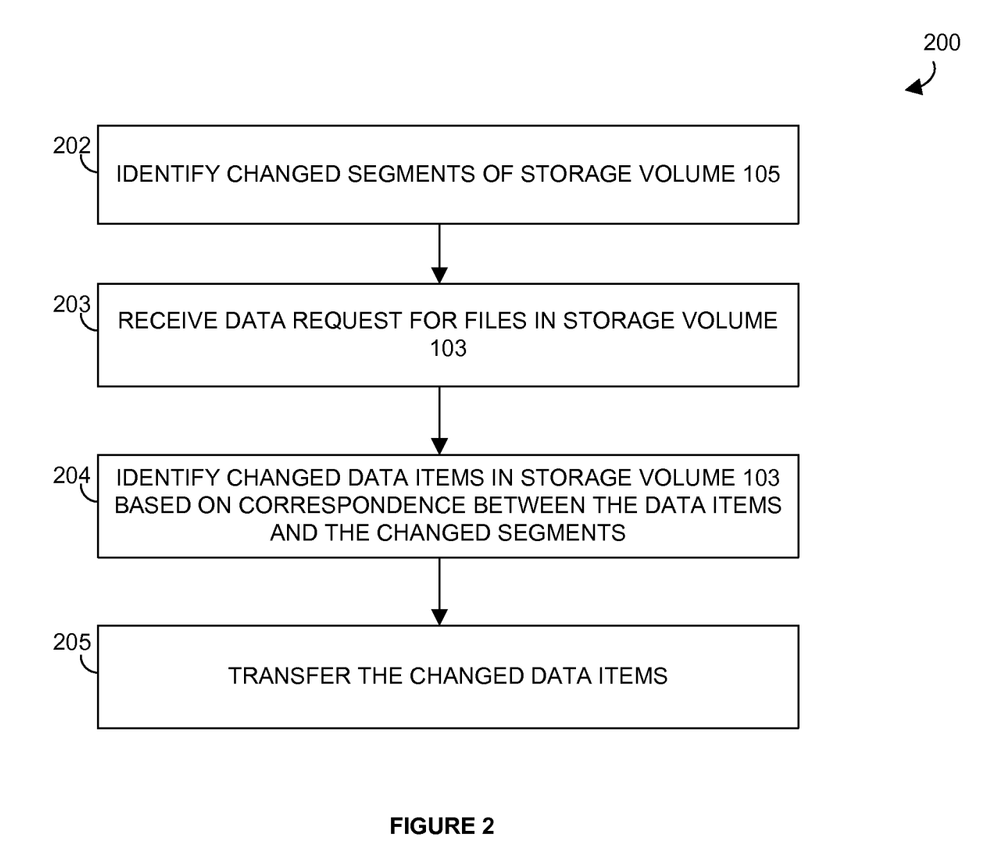
FIG. 2 illustrates the operation of a data identification system in an embodiment.

FIG. 2 illustrates process 200 describing the operation of data identification system 100. To begin, a volume of data is generated and stored. Processing system 101 identifies changed segments of segments 106 on storage volume 105 (Step 202) and receives a data item request for files in storage volume 103 (Step 203). A data item may be, for example, a file. Processing system 101, executing DI module 102, then identifies changed data items in storage volume 103 based on the correspondence between the data items 104 and the changed segments 106 (Step 204).

Lastly, processing system 101 transfers the changed data items (Step 205). Those skilled in the art will appreciate that data item and file transfers, as referred to herein, are typically not literally transfers. Rather, a version of the data item or file may be transferred or copied. However, in some embodiments, the files may literally be transferred.

Those skilled in art will also appreciate that data item requests may be used for a variety of applications. In fact, a data item request may be used by any user that benefits from identifying only the changed data items. For example, a data item request can be used to identify changed data items for scanning. Similarly, a data item request may be used to identify changed data items for computer or data forensics, compliance needs, or in order to log system changes. It should be understood that the user may be a human operator, as well as other software applications, hardware elements, or the like.

Figure 3:
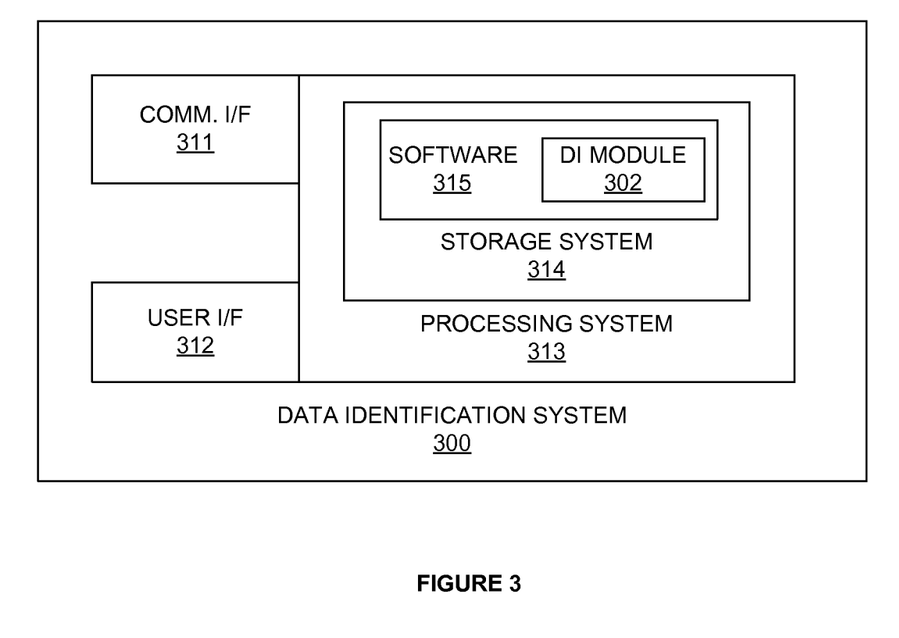
FIG. 3 illustrates a data identification system in an embodiment.

FIG. 3 illustrates data identification system 300 in another embodiment. Data identification system 300 includes communication interface 311, user interface 312, processing system 313, storage system 314, and software 315. Software 315 includes DI module 302. Processing system 313 is linked to communication interface 311 and 312. Software 315 is stored on storage system 314. In operation, processing system 313 executes software 315, including DI module 302.

Communication interface 311 comprises a network card, network interface, port, or interface circuitry that allows data storage system 300 to communicate with a storage volume. Communication interface 311 may also include a memory device, software, processing circuitry, or some other communication device. Communication interface 311 may use various protocols, such as host bus adapters (HBA), SCSI, SATA, Fibre Channel, iSCI, WiFi, Ethernet, TCP/IP, or the like to communicate with a storage volume.

User interface 312 comprises components that interact with a user to receive user inputs and to present media and/or information. User interface 312 may include a speaker, microphone, buttons, lights, display screen, mouse, keyboard, or some other user input/output apparatus—including combinations thereof. User interface 312 may be omitted in some examples.

Processing system 313 may comprise a microprocessor and other circuitry that retrieves and executes software 315, including DI module 302, from storage system 314. Storage system 314 comprises a disk drive, flash drive, data storage circuitry, or some other memory apparatus. Storage system 314 may further comprise a primary and secondary storage volume. The primary storage volume may comprise segments or portions. The secondary storage volume may comprise data items. Processing system 313 is typically mounted on a circuit board that may also hold storage system 314 and portions of communication interface 311 and user interface 314.

Software 315 comprises computer programs, firmware, or some other form of machine-readable processing instructions. Software 315 may include an operating system, utilities, drivers, network interfaces, applications, virtual machines, or some other type of software. When executed by processing system 313, software 315 directs processing system 313 to operate data storage system 300 in order to identify changed data items in the secondary storage volume.

In operation, a data item request for data items stored on the secondary storage volume may be received by data identification system 300 via communication interface 311 or user interface 312. Processing system 313 executes software 315 to processes the request by first identifying changed segments of the primary storage volume. Software 315 then identifies changed data items in the secondary storage volume based on the correspondence between the data items in the secondary storage volume and the changed segments of the primary storage volume. Lastly, software 315 transfers the identified changed data items in response to the request.

Figure 4:
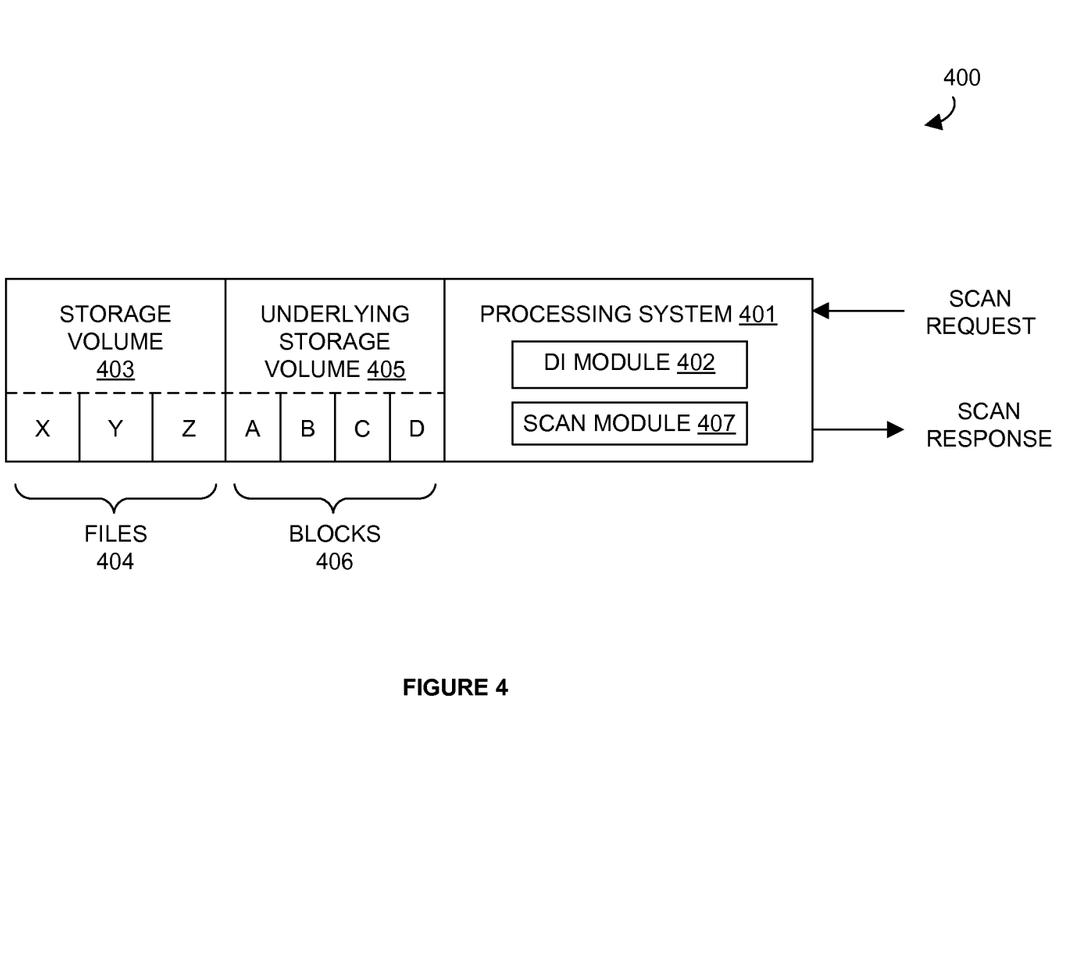
FIG. 4 illustrates a data identification system in an embodiment.

FIG. 4 illustrates data identification system 400 in another embodiment whereby DI module 402 is implemented in order to identify files 404 in a storage volume 403 and scan module 407 is implemented to incrementally scan files 404 for viruses. Data identification system 400 includes processing system 401, DI module 402, scan module 407, storage volume 403, and underlying storage volume 405. As shown, scan module 407 is separate from DI module 402. However, those skilled in the art will appreciate that scan module 407 may be contained within DI module 402.

Processing system 401 comprises any system or collection of systems capable of executing DI module 402 and scan module 407 to identify files in storage volume 403 and scan the files. Processing system 401 may be a micro-processor, an application specific integrated circuit, a general purpose computer, a server computer, or any combination or variation thereof. DI module 402 and scan module 407 may be program instructions executable by processing system 401.

Storage volume 403 may be a virtual storage volume. Storage volume 403 comprises files 404. Files 404 (shown as files X, Y, and Z) comprise the virtual storage contents of a data volume in storage volume 403. Files 404 comprise the volume of data in storage volume 403. Underlying storage volume 405 comprises blocks 406. Blocks 406 (shown as A, B, C, and D) comprise blocks or sections of the data volume in underlying storage volume 405.

Processing system 401 and/or underlying storage volume 105 may track blocks 406 of the data volume in storage volume 405 that have changed. In operation, processing system 401, executing DI module 402, uses the changed blocks in order to determine files that have changed on a virtual storage volume.

In this example, files 404 are requested by a user via scan request. Alternatively and/or additionally, requests for other applications (e.g., such as data forensic applications) may be made. Again, it should be understood that the user may be a human operator, as well as other software applications, hardware elements, or the like.

Figure 5:
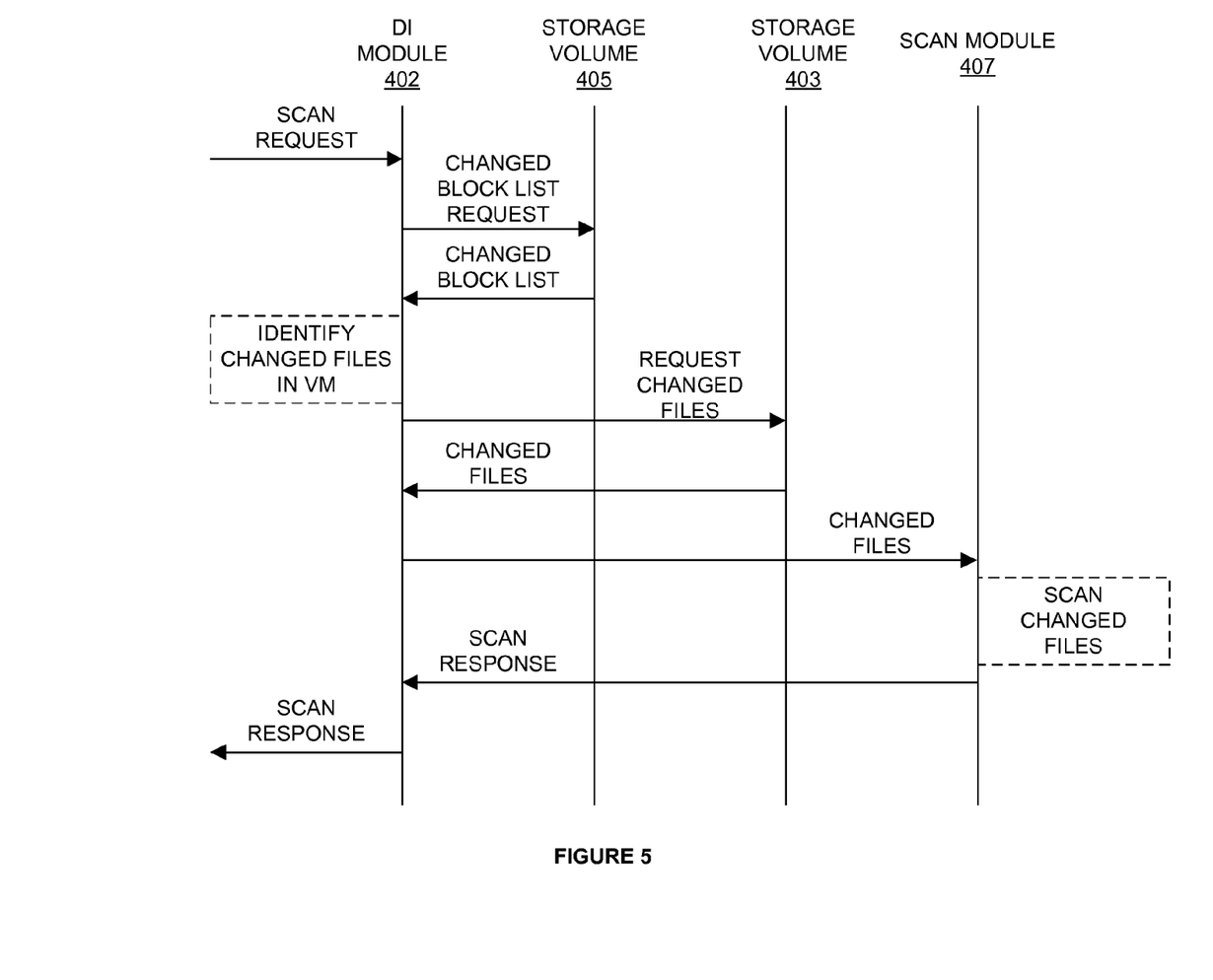
FIG. 5 illustrates the sequence of operation of a data identification system in an embodiment.

FIG. 5 illustrates a sequence diagram that illustrates operation of data identification system 400 according to an embodiment for scanning data files. In this example, data identification system 400 receives a scan request to scan files X, Y, and Z on storage volume 403.

Referring to FIG. 5, DI module 402 receives a scan request to scan files X, Y, and Z on storage volume 403. In order to reduce the number of files that need to be accessed from storage volume 403, DI module attempts to determine which of the files 404 have changed. To this end DI module 402 transfers a changed block list request to storage volume 405. In response, storage volume 405 transfers the changed block list to DI module 402. As shown, the changed block list is maintained by storage volume 405. Those skilled in the art will appreciate that the changed block list may be maintained processing system 401 or another element—or combination of elements—within data identification system 400.

Figure 6:
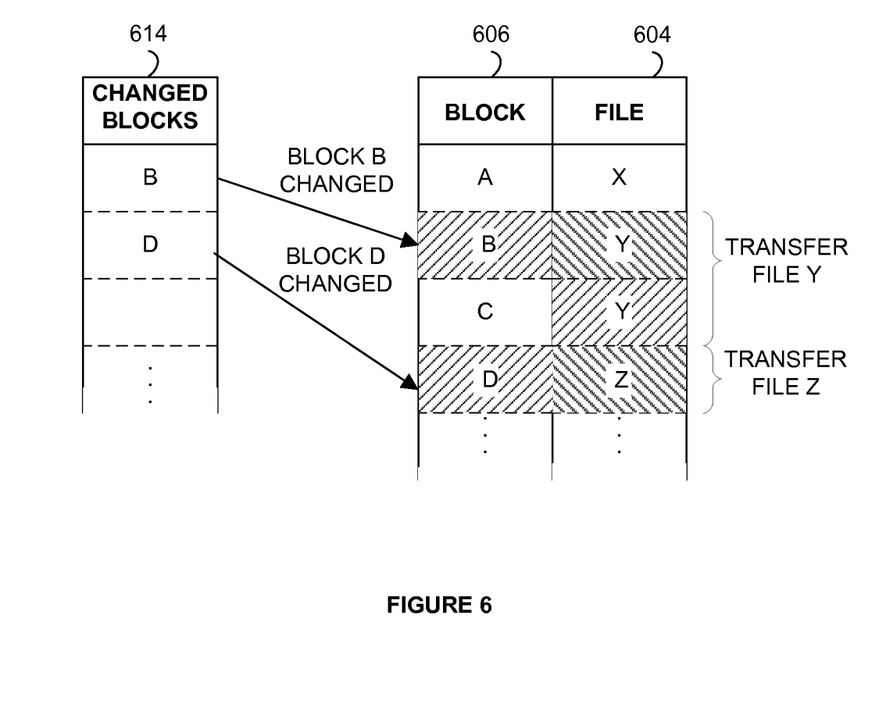
FIG. 6 illustrates a data identification system in an embodiment.

Once DI module 402 has obtained the changed block list, DI module 402 then identifies changed files in the virtual machine storage volume 403. For example, FIG. 6 shows changed block list 614. Changed block list 614 indicates that blocks B and D have been changed. Corresponding the blocks 606 to files 604 indicates that block A corresponds to file X, block B corresponds to file Y (which also corresponds to block C), and block D corresponds to file Z. Changed block list 614 can be used to reliably determine when a file's content has changed. Based on the changed blocks B and D, DI module 402 can identify the files that have changed. In this case, files Y and Z have changed. It is clear from FIG. 6 that some files (i.e., file Y) may occupy multiple blocks.

After the changed files have been identified, DI module 402 then transfers a request to storage volume 403 for the changed files. Those skilled in the art will appreciate that the request may be directed to the guest operating system for the virtual machine. In response, storage volume 403 returns the changed filed to DI module 402. DI module 402 responsively transfers the changed files to scan module 407 which scans the changed files and transmits a response to DI module 402. Those skilled in the art will appreciate that other process or operations—in lieu of or in addition to scanning—may be performed on the changed files. For example, DI module 402 may be used to access changed data files to be used in conjunction with data forensics. Lastly, DI module 402 then transfers a scan response which may indicate whether a virus was detected and which file or files are affected.

Figure 7:
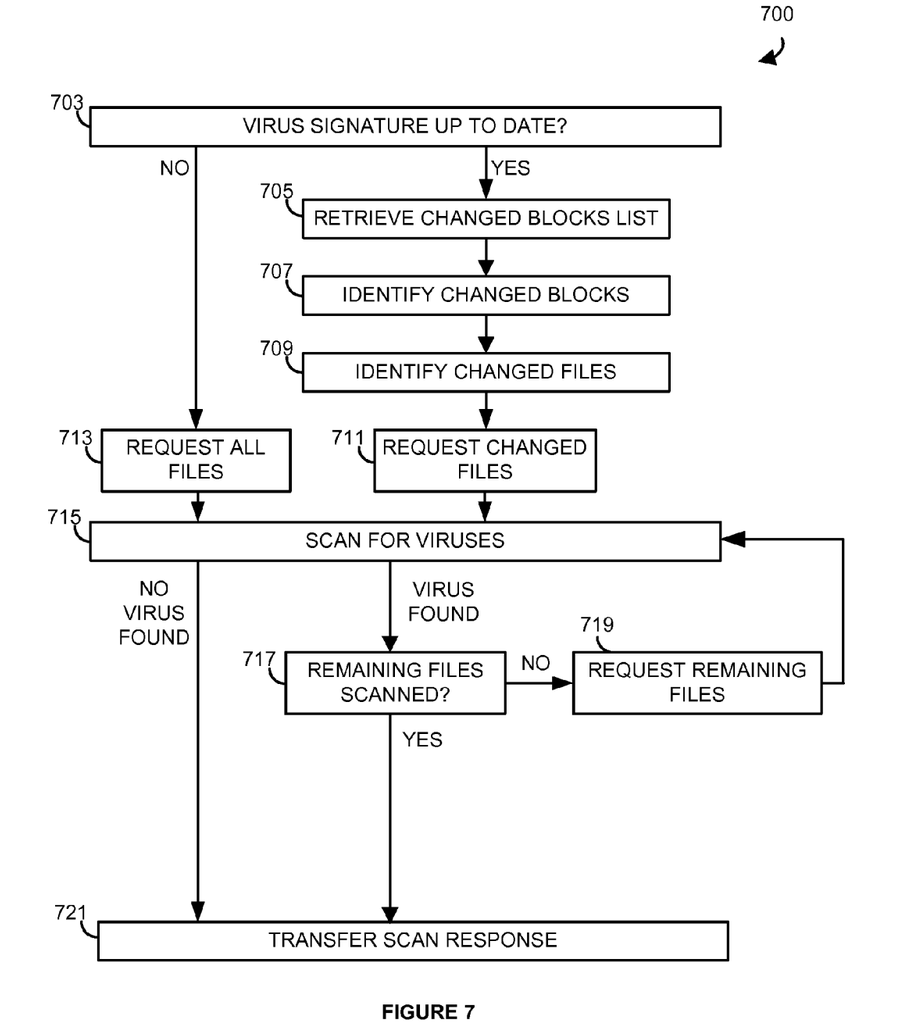
FIG. 7 illustrates the operation of a data identification system in an embodiment.

FIG. 7 illustrates the operation of data identification system 400 when executing DI module 402 for incrementally scanning a virtual storage volume on a virtual machine according to another embodiment. In this example, data identification system 400 receives a scan request to scan files on storage volume 403. Data identification system 400 responds with a scan response indicating whether or not a virus is detected.

In this case, DI module 402 first determines whether scan module 407 contains a virus signature file that is up to date (Step 703). Processing system 401 and/or scan module 407 may persistently store a unique identifier for the version of the virus software's signature file. Typically, the signature file is used to determine whether the virus software's signature has changed (i.e., whether there is an updated version of the software available). If a full scan has never been run on the target file system or the signature data has been updated since the last full scan then all files are requested for scanning (Step 713). In some embodiments, requests for files (i.e., Step 713, Step 711, and Step 710) can be omitted.

Alternatively, if the signature file is up-to-date then DI module 402 retrieves a changed block list from a virtual machine (Step 705). The changed block list may, for example, be retrieved from a guest O/S, a hypervisor, virtual hardware, or accessed via a V-disk file. Typically, the changed block list is generated by the hypervisor, the guest O/S, or the storage volume (i.e., underlying storage volume 405); however, other. Once the changed block list is obtained, DI module 402 identifies changed blocks on the virtual storage disk (Step 707) and the changed files (Step 709) that correspond to the changed blocks.

DI module 402 then requests the changed files from storage volume 403 for scanning (Step 711). Again, in some embodiments, requests for files may be omitted. Using FIG. 6 as an example, DI module 402 would request changed files Y and Z corresponding to changed blocks B and D, respectively.

Once requested files have been received, DI module 402 transfers the requested files to scan module 407. Those skilled in the art will appreciate that typically a file is not literally copied or transferred. Rather, a version can be transferred or copied. However, in some embodiments, the files may literally be transferred. Scan module 407 scans the files for viruses (Step 715). Those skilled in the art will appreciate that scan module 407 and DI module 402 may be a single software module. If no viruses are found, DI module 402 transfers a scan response indicating successful completion of scan with no detected virus (Step 721).

Alternatively, if a virus is found, DI module 402 determines whether the remaining files (those files on the virtual storage disk that have not changed) have been scanned (Step 717). Again, using FIG. 6 as an example, if either changed file Y or Z, or both, is found to have a virus, then the remaining files (i.e., file X) is requested for scanning.

If the remaining files have not been scanned then those files are requested (Step 719) and scanned (Step 715). DI module 402 then transfers a scan response indicating that the scan was completed successfully and indicates the virus(es) that were detected along with the affected files.

Figure 8:
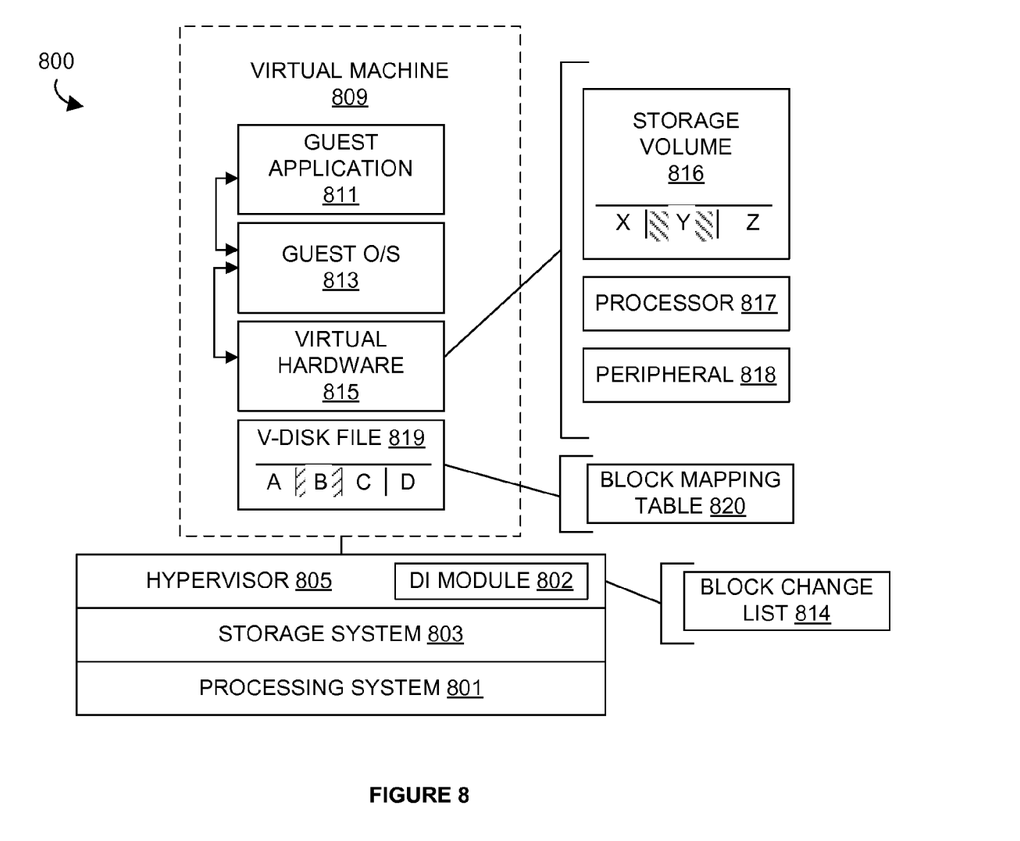
FIG. 8 illustrates a data identification system in an embodiment wherein a data identification module in a hypervisor operates to identify data items in a storage volume in a virtual machine.

FIG. 8 illustrates data storage system 800 in another embodiment. In this environment, data storage system 800 includes processing system 801, storage system 803, hypervisor 805, and DI module 802. As shown, DI module 802 is stored on hypervisor 805. However, those skilled in the art will appreciate that DI module 802 may be stored on storage system 803 or anywhere within hypervisor 805. Processing system 801 executes software including DI module 802 to identify data items on the virtual hardware.

Hypervisor 805 includes virtual machine 809. Virtual machine 809 includes guest application 811, guest operating system 813, virtual hardware 815, and virtual disk file 819. As shown, hypervisor 805 includes block change list 814 and virtual disk file 819 includes block mapping table 820. Virtual hardware 815 includes virtual storage volume 816, virtual processor 817, and virtual peripheral 818.

As shown, guest hypervisor 805 generates block change list 814. Those skilled in the art will appreciate that block change list 814 may be generated by an entity within virtual machine 809 (i.e., guest operating system 813), processing system 801, or storage system 803. In particular, changed block list 814 may be generated by replication software, continuous data protection (CDP) software, or virtual disk change block tracking software running on virtual machine 809, hypervisor 805, or processing system 801.

Block change list 814 describes the blocks that have changed on virtual disk file 819. Block mapping table 820 describes the storage of the data volume in virtual disk file 819. For example, block mapping table 820 may describe the correspondence between files on storage volume 816 and underlying virtual disk file 819.

In operation, DI module 802 is executed by processing system 801 to identify changed data items identified by virtual storage volume 816 stored in virtual disk file 819, using block change list 814 and block mapping table 820.

To begin, DI module 802 retrieves block change list 814 and, identifies changed blocks. The underlying data items contents can then be determined by, for example, using the block mapping table 820 to determine which data items correspond to the changed blocks. For example, block change list 814 may indicate that block B has changed and block mapping table 820 may indicate that block B corresponds to file Y.

Once the changed data items are determined, those changed data items can then be requested from virtual machine 809. For example, once DI module 802 determines that file Y changed, DI module 802 can then request file Y from storage volume 816. DI module 802 then transfers the changed file for further processing by a user requesting the changed file or for other use. Again, it should be understood that the user may be a human operator, as well as other software applications, hardware elements, or the like.

Figure 9:
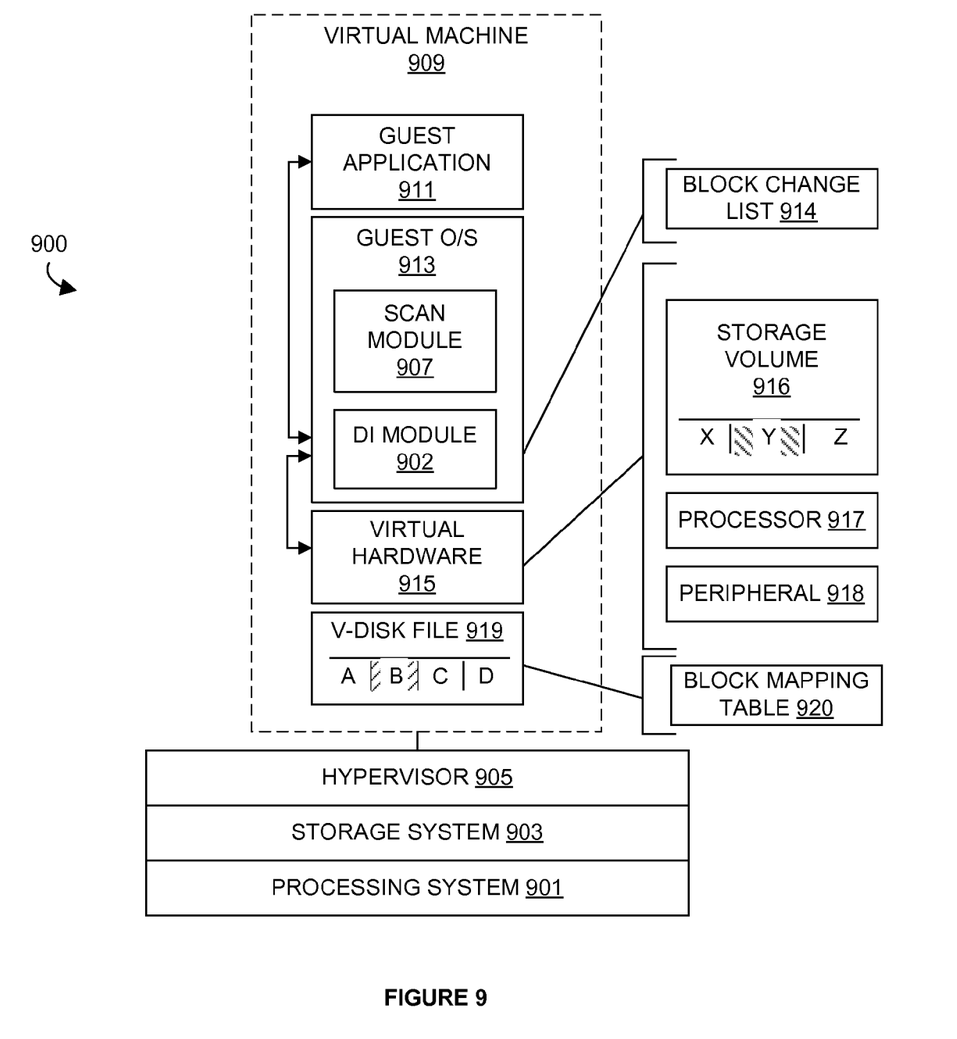
FIG. 9 illustrates a data identification system in an embodiment wherein a data identification module in a hypervisor operates to identify files in a storage volume in a virtual machine and a scan module in a guest application operates to scan the files.

FIG. 9 illustrates data storage system 900 in another embodiment. Data storage system 900 is similar to data storage system 800, shown in FIG. 8, except that DI module 902 and scan module 907 are located within guest operating system 913. In this embodiment, DI module 902 comprises program instructions executable within an operating system environment, such as guest operating system 913. Scan module 907 comprises program instructions executable on guest operating system 913.

In operation, DI module 902 is executed by processing system 901 within guest operating system 913 to identify changed data items on the data volume stored in virtual disk file 919, using block change list 914 and block mapping table 920. Scan module 907 is executed by processing system 901 and/or processor 917 to scan the changed data items.

DI module 902 retrieves block change list 914 and, identifies changed blocks. In this example, block B has changed. The underlying data items contents can then be determined by, for example, using the block mapping table 920 to determine which data items correspond to the changed blocks. In this example, data item Y corresponds to changed block B.

Once the changed data items are determined, those changed data items can be requested by DI module 902 and transferred to scan module 907 for scanning.

In other embodiments, DI module 902 may simply transfer a list of the changed data items. In this case, scan module 907 can request the changed data items from storage volume 916 and scan the data items. Again, those skilled in the art will appreciate that the files may not be literally transferred. Rather, versions of the files can be copied. Once scanned, scan module 907 can communicate with DI module 902 and transfer a scan response.

Figure 10:
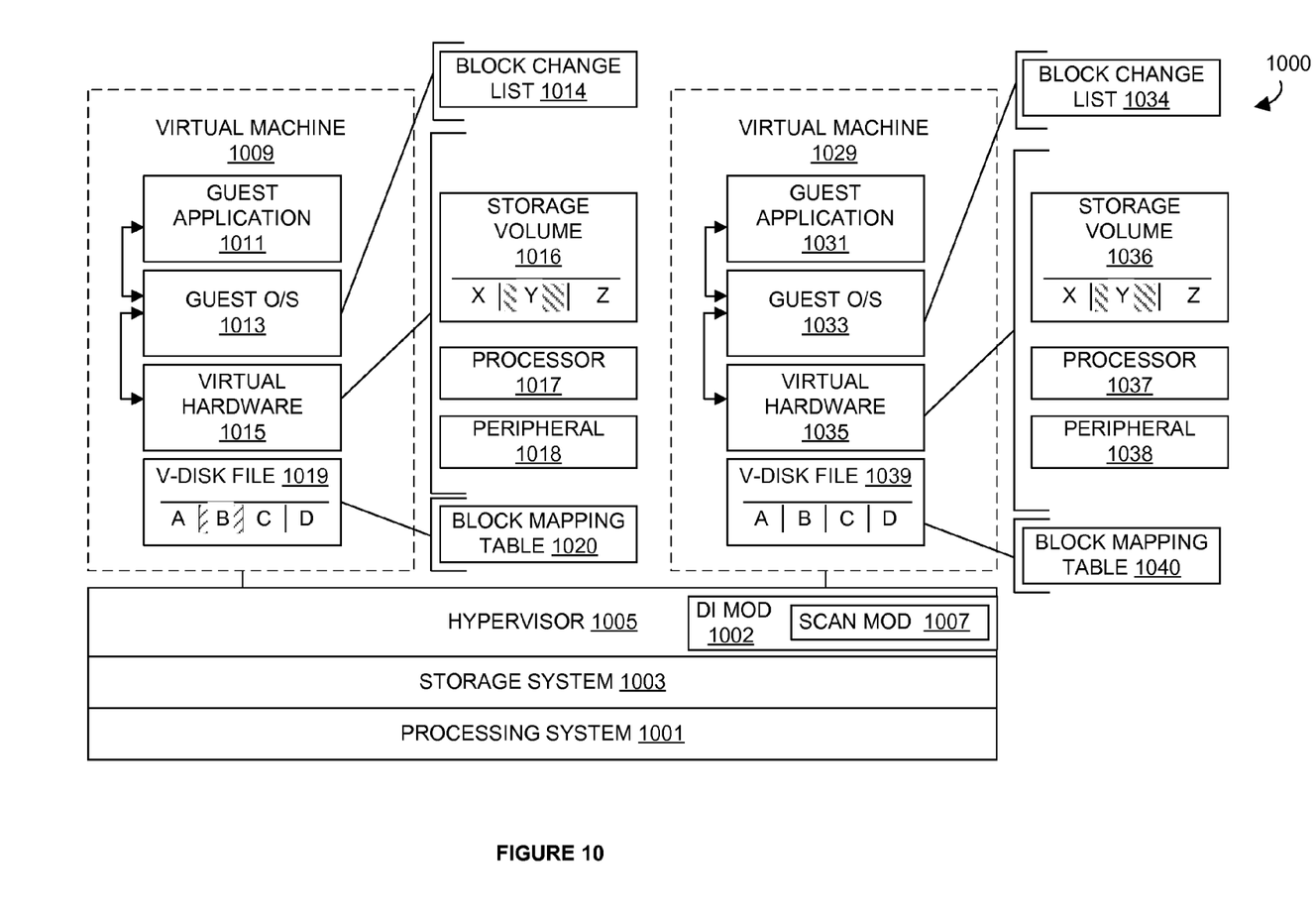
FIG. 10 illustrates a data identification system in an embodiment wherein a data identification module in a hypervisor operates to identify data items in multiple storage volumes in multiple virtual machines.

FIG. 10 illustrates data storage system 1000 in another embodiment. Data storage system 1000 is similar to data storage system 800 and 900, shown in FIGS. 8 and 9, except that multiple virtual machines are shown, DI module 1002 is within hypervisor 1005, and scan module 1007 is within DI module 1002. In this embodiment, DI module 1002 comprises program instructions executable within hypervisor 1005 for identifying changed data items on storage volume 1016 and storage volume 1036.

Those skilled in the art will appreciate that scan module 1007 and DI module 1002 can reside in different locations anywhere on virtual machine 1009 and/or virtual machine 1029. For example, DI module 1002 may be located within virtual machine 1009 and executed to determine changed data items on virtual machine 1029. Similarly, scan module 1007 may be located on virtual machine 1009 and executed to scan changed data items from virtual machine 1029.

In operation, DI module 1002 is executed by processing system 1001 to identify changed data items on the data volume stored in virtual disk file 1019 and changed data items on the data volume stored in virtual disk file 1039. Changed data items on the data volume stored in virtual disk file 1019 are determined using block change list 1014 and block mapping table 1020. Changed data items on the data volume stored in virtual disk file 1039 are determined using block change list 1034 and block mapping table 1040. Scan module 1007 is executed by processing system 1001 to scan the changed data items.

DI module 1002 operates similarly to the DI module 902 and 802. However, in some embodiments, multiple instances of DI module 1002 (not shown for simplicity) may be executed in parallel by processing system 1001 to identify and scan changed data items on the data volume stored in virtual disk file 1019 and the data volume stored in virtual disk file 1039.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data identification system for identifying data items in a storage system, the method comprising:

receiving a scan request to scan files on a secondary storage volume;

identifying changed segments of a primary storage volume, wherein the primary storage volume comprises a virtual disk file; wherein the identifying the changed segments of the primary storage volume comprising the steps of:
generating a request for a changed segment list;
transferring the request for the changed segment list;
receiving the changed segment list;
processing the changed segment list to determine the changed segments of the primary storage volume;
identifying changed data items of the plurality of data items in the secondary storage volume based on a correspondence between the plurality of data items in the secondary storage volume and the changed segments of the primary storage volume;
retrieving the changed data items from the secondary storage volume; and
transferring the changed data items in response to the scan request.

2. The method of claim 1 wherein the scan request comprises a scan request to scan the plurality of data items.

3. The method of claim 2 further comprising receiving the changed data items and responsively scanning the changed data items for a virus.

4. The method of claim 3 further comprising transferring unchanged data items in response to detecting a virus in one of the changed data items.

5. The method of claim 1 further comprising transferring a request for the changed data items to the virtual storage device and receiving the changed data items in response to the request.

6. The method of claim 1 wherein the data request further comprises a request for a plurality of data items in a second secondary storage volume.

7. The method of claim 6 further comprising:
identifying second changed blocks of a second primary storage volume;
identifying second changed data items of the plurality of data items in the second secondary storage volume based on a correspondence between the plurality of data items in the second secondary storage volume and the second changed blocks of the second primary storage volume; and
transferring the second changed data items in response to the data request.

8. A data identification system, the system comprising:
a storage system configured to store a primary storage volume comprising a plurality of segments;
a communication interface configured to receive a scan request for a plurality of data items in a secondary storage volume and transfer changed data items in response to the scan request;
a processing system configured to identify changed segments of the primary storage volume, identify the changed data items of the plurality of data items in the secondary storage volume based on a correspondence between the plurality of data items in the secondary storage volume and the changed segments of the primary storage volume, wherein the processing system is further configured to generate a request for a changed segment list, transfer the request for the changed segment list to the primary storage volume, receive the changed segment list from the primary storage volume, and process the changed segment list in order to determine the changed segments of the primary storage volume.

9. The data identification system of claim 8 wherein the scan request comprises a scan request to scan the plurality of data items.

10. The data identification system of claim 9 further comprising a data item scanner configured to receive the changed data items and responsively scan the changed data items for a virus.

11. The data identification system of claim 10 wherein the processor is further configured to transfer unchanged data items in response to the data item scanner detecting a virus in one of the changed data items.

12. The data identification system of claim 8 wherein the primary storage volume comprises a virtual disk file.

13. The data identification system of claim 12 wherein the secondary storage volume comprises a virtual storage device, and wherein the virtual disk file contains the first virtual storage device.

14. The data identification system of claim 13 wherein the processor is further configured to transfer a request for the changed data items to the virtual storage device and receive the changed data items in response to the request.

15. The data identification system of claim 8 wherein the processor is further configured to identify changed blocks of a second primary storage volume, identify changed data items of the plurality of data items in the second secondary storage volume based on a correspondence between the plurality of data items in the second secondary storage volume and the changed blocks of the second primary storage volume, and transfer the changed data items in response to the scan request.

16. A non-transitory computer readable medium having program instructions stored thereon for operating a data identification system that, when executed by a data identification system, direct the data identification system to:
receive a scan request for a plurality of data items in a secondary storage volume;
identify changed segments of a primary storage volume, wherein the primary storage volume comprises a virtual disk file stored on a storage system; wherein the identifying the changed segments of the primary storage volume comprising the steps of:
generating a request for a changed segment list;
transferring the request for the changed segment list;
receiving the changed segment list;
processing the changed segment list to determine the changed segments of the primary storage volume;
identify changed data items of the plurality of data items in the secondary storage volume based on a correspondence between the plurality of data items in the secondary storage volume and the changed segments of the primary storage volume;
retrieving the changed data items from the secondary storage volume; and
transfer the changed data items in response to the scan request.

* * * * *